INVENTOR
Otto W. Schaefer
BY Cecil L. Rood
ATTORNEY

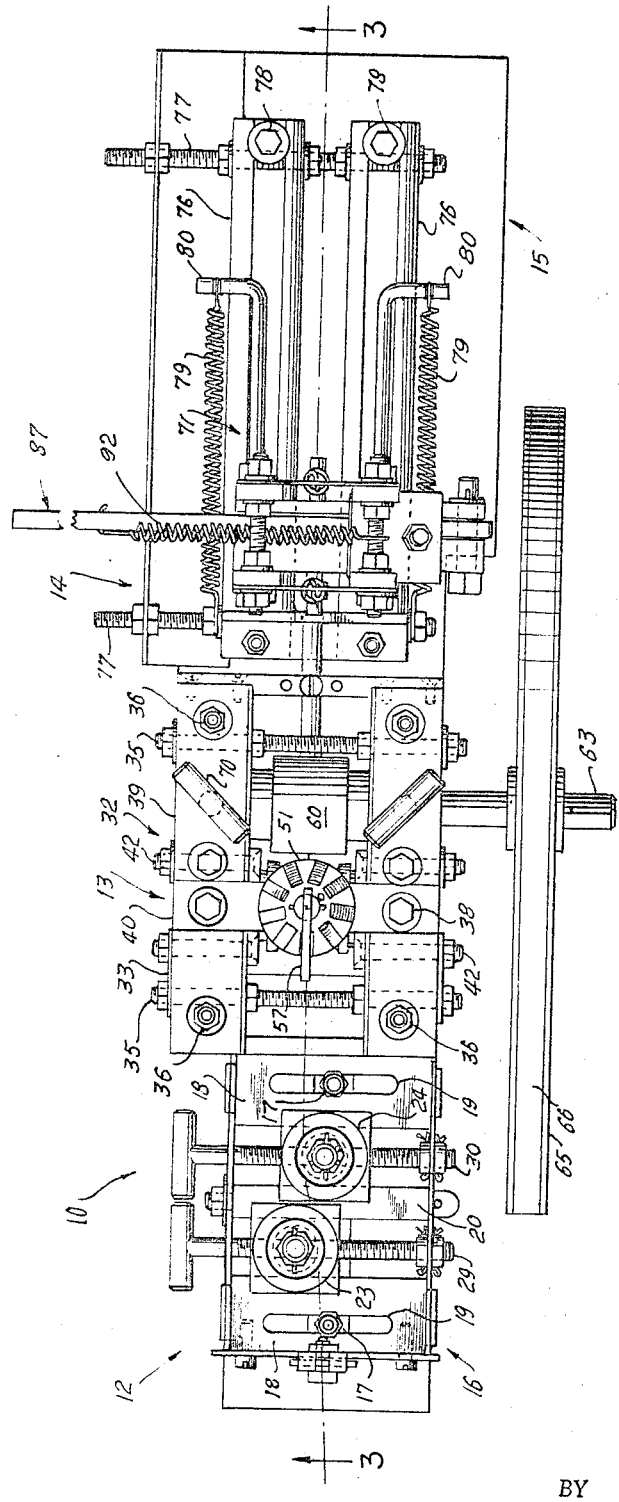
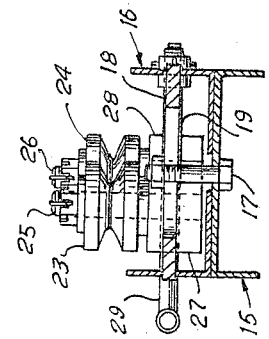
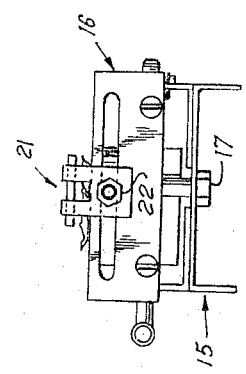

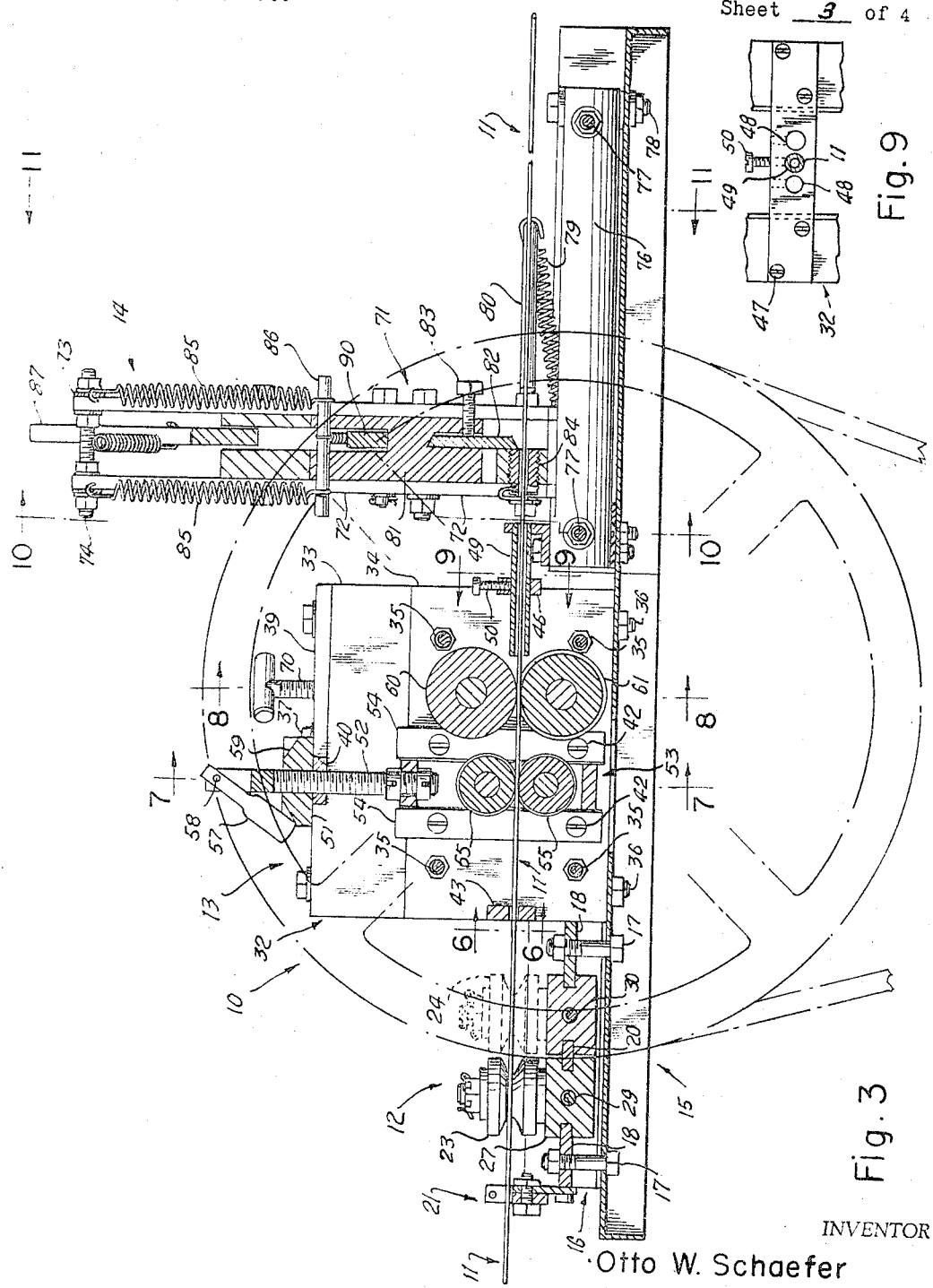

United States Patent Office 3,428,097
Patented Feb. 18, 1969

3,428,097
WIRE STRAIGHTENING AND CUTTING MECHANISM
Otto W. Schaefer, Dallas Tex.
(2838 Alan-A-Dale, Irving, Tex. 75060)
Filed July 20, 1966, Ser. No. 566,664
U.S. Cl. 140—140
Int. Cl. B21f *1/02, 11/00*
3 Claims

ABSTRACT OF THE DISCLOSURE

A mechanism for straightening and cutting heavy gauge wire generally packaged in coils of relatively large diameter and which is straightened before cutting into predetermined lengths. The device includes a frame on which is mounted a first set of peripherally grooved rollers on vertical axes in offset planes for lateral pressures on the wire, and a second set of rollers, also having peripheral grooves, mounted on horizontal axes for pressures in a vertical plane. The wire is impelled through the respective sets of rollers by a driven roller and an idler roller mounted on horizontal axes in operative relation to the first and second sets of rollers. A manually actuated knife assembly is provided for cutting the wire into desired lengths.

---

This invention relates to a wire straightening and cutting device, and it has particular reference to an apparatus for straightening wire as it is unwound from coils thereof, and for cutting the wire in predetermined lengths, as desired, after it has been straightened.

The invention is intended primarily for straightening and cutting wire for use as hangers in the erection of suspended or false ceilings. In accordance with usual practice such wire is of comparatively heavy gauge, and is characterized by its stiffness, and is supplied to builders in the form of coils each comprising a measured length of wire, which may be several hundred feet. The wire is ordinarily straightened in the field and thereafter cut in short, predetermined lengths to prepare it for use for the purpose described.

A prime object of the invention is that of providing a simple and efficient apparatus as described which is of light weight, whereby it is portable, and which may be conveniently employed for straightening and cutting wire in the field and may be readily transported from one place to another as needed.

Other and lesser objects will become apparent as the description proceeds, when considered in connection with the appended drawings wherein:

FIGURE 2 is a top plan view thereof.

FIGURE 3 is a longitudinal sectional elevational view taken on the line 3—3 of FIGURE 2, showing a length of wire being straightened and showing the guillotine type cutter in its raised position preparatory to cutting off a straightened portion of the wire.

FIGURE 4 is an end elevational view showing the left end of the device as illustrated in FIGURES 1 to 3, which is its receiving end.

FIGURE 5 is a transverse sectional elevational view taken on the line 5—5 of FIGURE 1, showing the arrangement of the straightening pulleys.

FIGURE 9 is a transverse sectional elevational view, taken on the line 9—9 of FIGURE 3, showing the wire guide element.

Figure 1:
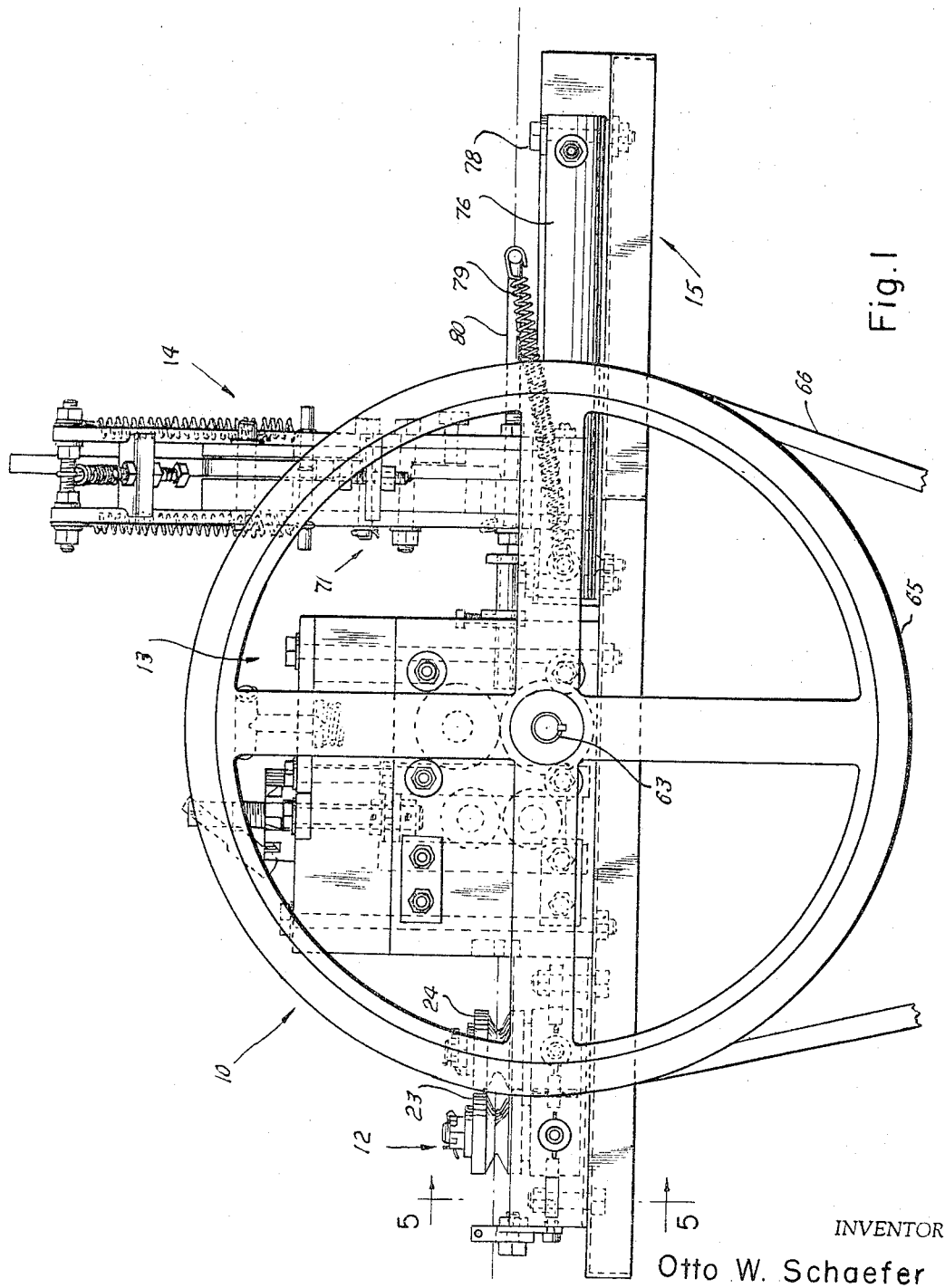
FIGURE 1 is a side elevational view of a wire straightening and cutting device embodying the invention.

Referring primarily to FIGURE 3 of the drawing, which shows the invention schematically and illustrates its operation, the numeral 10 designates generally the wire straightening and cutting device of the invention, and the numeral 11 indicates a length of wire arranged thereon, as in straightening and cutting it.

For convenience the wire straightening and cutting device 10 is formed in three separate units as hereinafter described, designated generally by the numerals 12, 13 and 14, which are arranged end to end on an elongated, horizontally extending frame structure 15. The frame structure 15, which provides a base on which the respective units 12, 13 and 14 are supported, in turn may be supported temporarily on any convenient support, such as a sturdy table or other suitable devices.

Beginning at the left, as shown in FIGURES 1 to 3, the first two of said units, indicated by the numerals 12 and 13, are operable to straighten the wire 11, and at the same time to align it with the wire straightening and cutting device 10, preparatory to cutting the wire 11 to desired lengths by operation of the third of said units, indicated by the numeral 14.

In operation, the wire 11 is unwound from a coil arranged on a reel (not shown) which is positioned at the left of the wire straightening and cutting device 10, as illustrated in FIGURES 1 to 3, and turns about a vertical axis. The reel is positioned to one side of the longitudinal axis of the mechanism 10 so that the wire 11 will be substantially aligned with the axis as it is unwound from said coil.

The apparatus further includes means (not shown) for measuring the wire 11 as it is straightened and thereafter advanced from left to right, as shown in FIGURES 1 to 3, whereby it extends beyond the third of said units, indicated by the numeral 14, which is the cutting unit. The cutting unit 14 is operable manually, as hereinafter described.

The apparatus also includes a suitable motor (not shown) acitng on one of the two pull or impelling rolls, as hereinafter described, which are incorporated in the second of said units, indicated by the numeral 13, through drive means including a belt and pulley arrangement, shown in FIGURES 1 and 2.

Referring now to FIGURES 4 and 5, which with FIGURES 1 to 3 show the first of said units, indicated by the numeral 12, includes a sub-frame, designated generally by the numeral 16, which is supported on the frame structure 15 and is removably and adjustably connected thereto by a pair of bolts 17.

The sub-frame 16 is formed in part by a pair of transversely extending guide bars 18 which have elongated slots 19 therein for engagement by the respective bolts 17 whereby the sub-frame 16 is removably and adjustably connected to the frame structure 15. A third guide bar 20, which is connected at its ends to the sub-frame 16, is arranged parallel to and between the first mentioned guide bars 18, in spaced apart relation thereto, for use as hereinafter described.

A guide member, shown in FIGURE 4 and designated generally by the numeral 21, which is positioned immediately adjacent the receiving end of the wire straightening and cutting device 10, is removably and adjustably connected to the sub-frame 16 by a bolt 22. The guide member 21 comprises an enclosure which extends upwardly from the sub-frame 16 and loosely encircles the wire 11, as it is delivered to the wire straightening and cutting device 10, whereby the wire 11 is aligned substantially with the longitudinal axis of the device 10.

A pair of rollers 23 and 24, which are positioned on opposite sides of the longitudinal axis of the wire straightening and cutting device 10, in longitudinally spaced relation thereto, have peripheral grooves therein for frictional engagement with opposite sides of the wire 11, as shown best in FIGURE 3, whereby the wire 11 is straightened in a lateral direction as it is advanced relative to the rollers 23 and 24.

The rollers 23 and 24 are rotatable about vertical axes, and are journaled on stub shafts 25 and 26 which extend upwardly from a pair of blocks 27 and 28 which are slidable laterally on the adjacent transverse bars 18 and 20 and are threaded on a pair of screws 29 and 30 extending transversely of the sub-frame 16 and journaled on one side thereof, whereby the rollers 23 and 24 are adjustable laterally relative to the sub-frame 16.

Referring now to FIGURES 6 to 9, which with FIGURES 1 to 3 show the second of said units above mentioned, indicated by the numeral 13, said second unit 13 includes a sub-frame 31 comprising two opposite sides 32 each having separable upper and lower sections 33 and 34.

The sides 32 of the sub-frame 31 are connected in parallel, spaced apart relation to each other by two pairs of bolts 35. The sides 32 are connected to the supporting frame structure 15 by two pairs of bolts 36, and the upper and lower sections 33 and 34 are additionally connected by two pairs of bolts 37 and 38, which with the bolts 36 also secure a pair of cover plates 39 and a cross bar 40, hereinafter referred to, respectively.

Figure 8:
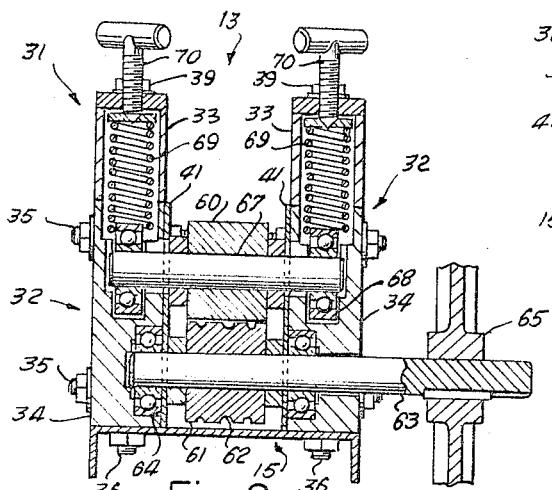
FIGURE 8 is a transverse sectional elevational view, taken on the line 8—8 of FIGURE 3, showing the tensioning means for the impelling rollers.

As shown in FIGURES 2 and 8, the sides 32 of the enclosure 31 are comparatively thick, and the top and inside faces thereof, which are irregular as hereinafter described, are covered by the cover plates 39 and a pair of inside plates 41 which are secured by the bolts 35 and by bolts 42.

Figure 6:
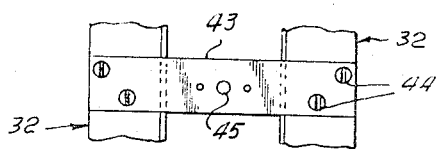
FIGURE 6 is a transverse sectional elevational view taken on the line 6—6 of FIGURE 3.

As shown in FIGURE 6, a guide plate 43, which extends transversely across the receiving ends of the sides 32 and is secured thereto by screws 44, has a plurality of three laterally spaced apertures 45, of different sizes, therein for selective engagement by the wire 11. One of the apertures 45 is aligned with the longitudinal axis of the wire straightening and cutting device 10 and with the guide member 21, and with the opposing grooves of the rollers 23 and 24.

As shown in FIGURE 9, a guide plate 46, which extends transversely across the delivery ends of the sides 32 and is secured thereto by screws 47, has a plurality of three laterally spaced apertures 48 therein for selective engagement by the wire 11. One of the apertures 48, which correspond to the apertures 45 in the guide plate 43, has a tubular guide 49 passed through it and secured against displacement therefrom by a set screw 50.

Figure 7:
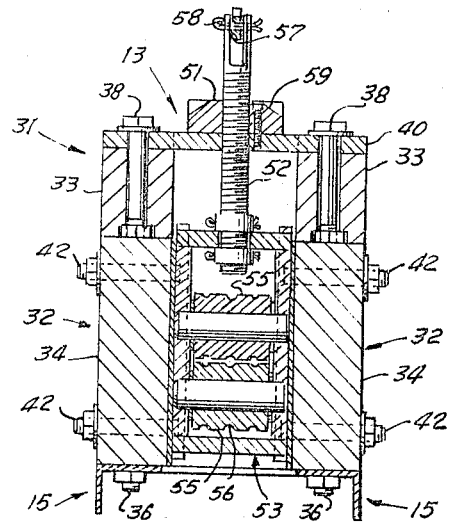
FIGURE 7 is a transverse sectional elevational view taken on the line 7—7 of FIGURE 3, of the grooved impelling rollers.

As shown in FIGURE 7, the cross bar 40 above mentioned, which extends transversely across the tops of the sides 32, in spaced apart relation to the receiving ends thereof, has a nut 51 thereon for engagement by a threaded rod 52 which has suspended from its lower end, for axial adjustment relative thereto, a roller support 53 as hereinafter described, whereby the roller support 53 is adjustable vertically relative to the sides 32 upon rotation of the threaded rod 52 relative to the nut 51.

The roller support 53 comprises an elongated, generally rectangular frame having two parallel sides which engage slide elements 54 on the opposing inside faces of the sides 32 and have a pair of rollers 55 arranged between them, in opposing relation to each other, for rotation about horizontal axes. The rollers 55 have a plurality of three laterally spaced peripheral grooves 56, corresponding to the holes 45 and 48 in the guide plates 43 and 46, in the opposing surfaces thereof for selective engagement by the wire 11, for vertical adjustment of the wire 11 relative to the sides 32.

The threaded rod 52 has a handle 57 pivotally connected at one end to the upper end of the rod 52, for use in adjusting the latter axially relative to the nut 51, to raise and lower the rollers 55. The handle 57 depends from its pivot when not in use, as indicated by the numeral 58, and the nut 51 has a plurality of circumferentially spaced indentations 59 in its upper face immediately adjacent its peripheral surface for selective engagement by the free end of the handle 57 in its depending position to secure the handle 57 and the rod 52 in any of their adjusted positions.

A pair of superimposed pull rollers 60 and 61 are arranged between the sides 32, and between the rollers 55 and the guide plate 46. As shown in FIGURE 8, the lowermost roller 61, which is driven as hereinafter described, has peripheral grooves 62 therein corresponding to the grooves 56 of the rollers 55.

The lowermost roller 61 is fixed on a shaft 63 which is arranged transversely of the side members 32 and extends through an opening therefor in one of the latter. The lowermost roller 61 is journaled in bearings 64 therefor in the respective sides 32. A pulley 65 on the outer end of the shaft 63 is adapted to be driven by a belt 66, through means not shown.

The uppermost roller 60 is fixed on a shaft 67 which is arranged transversely of the sides 32 and is journaled in bearings 68 therefor in these members. The bearings 68 are adjustable vertically relative to the sides 32, and are acted on by a pair of compression springs 69 which are positioned above the bearings 68, between the bearings 68 and the cover plates 39. The compression springs 69 have adjusting screws 70 which extend through the cover plates 39, whereby the uppermost roller 60 is leveled and maintained in yieldable frictional engagement with the lowermost roller 61.

The wire 11 is received between the pull rollers 60 and 61, in selective engagement with one of the grooves 62 of the lowermost roller 61, whereby the wire 11 is advanced longitudinally relative to the wire straightening and cutting device 10 by the action of the rollers 60 and 61.

Figure 10:
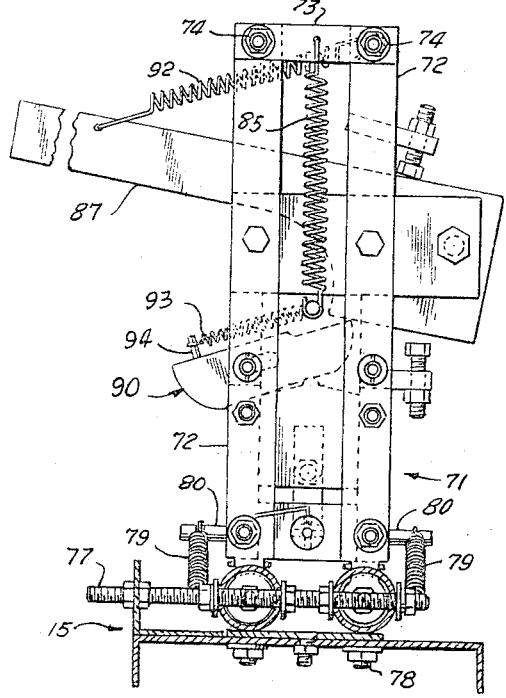
FIGURE 10 is a transverse sectional front elevational view of the cutting assembly, taken on the line 10—10 of FIGURE 3.
Figure 11:
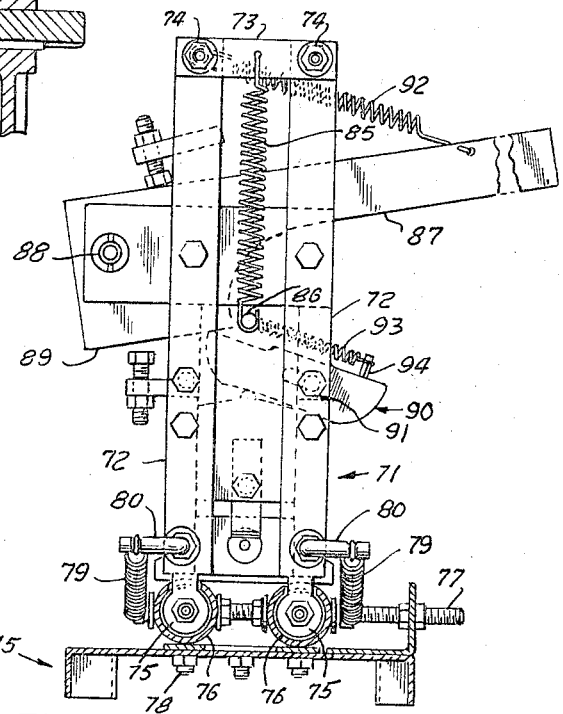
FIGURE 11 is a transverse sectional rear elevational view of the cutting assembly, taken on the line 11—11 of FIGURE 3.

Referring now to FIGURES 10 and 11, which with FIGURES 1 to 3 show the third unit of the invention, indicated by the numeral 14, and which includes a sliding carriage comprising an upstanding generally rectangular sub-frame 71 having two pairs of corner posts 72 which are connected at the top, in parallel spaced apart relation, by connecting strips 73 and bolts 74, and are supported on runners 75 for sliding adjustment relative to a pair of tubular slides 76.

The tubular slides 76 are arranged longitudinally of the supporting frame structure 15, on opposite sides of the longitudinal axis of the wire straightening and cutting device 10, and the carriage comprising the sub-frame 71 is adjustable longitudinally relative to the supporting frame structure 15 by sliding engagement of the runners 75 with the tubular slides 76.

The tubular slides 76 are supported above the supporting frame structure 15 for lateral adjustment relative thereto by a pair of elongated bolts 77, which are connected to one side of the frame structure 15, and are additionally secured in their adjusted positions by hold down bolts 78.

Movement of the carriage comprising the sub-frame 71 from left to right, as shown in FIGURES 1 to 3, is resisted by the action of a pair of tension springs 79 on opposite sides of the sub-frame 71 which are connected at their ends to the respective tubular slides 76 and to a pair of angular bolts 80 which in turn are connected to the sub-frame 71 near the bottom thereof.

A blade holder 81, which has a blade 82 removably and adjustably connected thereto adjacent its lower end, by a set screw 83, is adjustable vertically within the sub-frame 71. The blade 82 coacts with a fixed tubular element 84, through which the wire 11 is passed, as shown best in FIGURE 3, to cut the wire 11 in response to downward movement of the blade 82.

The blade holder 81 is bifurcated beginning at its upper end, and is yieldably supported by a pair of tension springs 85, on opposite sides of the sub-frame 71, which are connected at their ends to the respective connecting strips 73 and to opposite ends of a pin 86 which extends transversely through the bifurcated upper end of the blade holder 81.

An elongated lever 87, which is pivotally connected at one end, as at 88, to a bracket 89 extending laterally outwardly from the sub-frame 71, above the blade holder 81, and has an operating handle extending upwardly and laterally outwardly beyond the side of the sub-frame 71 opposite its pivot 88, and an abutment on its underside, as at 89, near its pivot 88, for engagement with a second, relatively smaller lever 90, which is pivotally and adjustably connected intermediate its ends, as at 91, to the opposite side of the sub-frame 71, whereby the second lever 90 is urged downwardly, with the blade holder 81, in response to downward movement of the lever 87 about its pivot 88. The second lever 90 is operated between the bifurcations in the upper end portion of the blade holder 81.

Downward movement of the first mentioned lever 87 about its pivot 88 is resisted by the action of a tension spring 92, which is connected at one end to one of the bolts 74. The downward movement of the second lever 90, with the blade holder 81, is resisted by the action of a tension spring 93, which is connected at its ends to the pin 86 intermediate its ends and to an upstanding pin 94 on the end of the second lever 90 opposite the end thereof which is in abutting engagement with the first mentioned lever 87, as at 89.

A pair of screws 95, which are adjustable relative to brackets 96 which extend laterally outwardly from the sub-frame 71, above and below the lever 87, for abutting engagement therewith, limit movement of the lever 87 in either direction about its pivot 88.

In operation, the carriage comprising the sub-frame 71 is moved longitudinally of the supporting frame structure 15, with the wire 11, against the resistance of the springs 79, by engagement of the blade 82 with the wire 11, during the brief time interval while the wire 11 is being cut.

The invention may be modified within certain limitations by persons skilled in the art without departing from the spirit and intent thereof or the scope of the appended claims.

What is claimed is:

1. In a portable device for straightening and cutting wire into measured lengths from coils, having a horizontally disposed frame structure providing a supporting base, the improvements comprising: a plurality of separate units arranged on said frame structure in longitudinally spaced relation thereto and in laterally adjustable relation to each other, the first of said units including a pair of rollers rotatable on vertical axes in spaced offset alignment with respect to the longitudinal axis of said frame structure, each roller having a peripheral groove therein engageable with the wire whereby to straighten it as it is advanced longitudinally of said frame structure, the second of said units including a pair of vertically adjustable superposed positioning rollers arranged transversely of said frame structure and rotatable about vertically aligned horizontal axes and engageable with the wire as it is advanced from said first unit to said second unit, a third unit including a pair of adjustable superposed pull rollers on horizontal axes arranged transversely of said frame structure, one of said pull rollers being driven and the other of said pull rollers being spring tensioned and having yieldable, frictional engagement with said wire whereby the latter is advanced longitudinally relative to said frame structure, and a cutting unit including a vertically adjustable and yieldably supported blade acting on the wire and a handle for manually operating the blade.

2. The structure of claim 1, the positioning rollers and the driven pull roller of said second and third units having a plurality of different sized peripheral grooves for selective engagement by the wire, corresponding grooves of the positioning rollers and the driven pull roller being aligned longitudinally with each other, and said second and third units having wire guides on their receiving and delivery ends each having a plurality of holes therein corresponding to said grooves for selective engagement by the wire.

3. The structure of claim 1, the wire guide on the delivery end of said second and third units having a longitudinally extending tubular wire guide received in one of said holes, and the said cutting unit having a short tubular element, aligned axially with said tubular wire guide, through which the wire is passed and which coacts with said blade to cut off the wire.

References Cited

UNITED STATES PATENTS

| | | | |
|---|---|---|---|
| 383,200 | 5/1888 | Weber et al. | 83—633 |
| 711,435 | 10/1902 | Morris | 83—633 |
| 1,048,141 | 12/1912 | Fetherolf | 140—140 |
| 1,435,438 | 11/1922 | Wright | 140—140 |
| 1,714,094 | 5/1929 | Kilmer | 140—140 |

CHARLES W. LANHAM, *Primary Examiner.*

LOWELL A. LARSON, *Assistant Examiner.*

U.S. Cl. X.R.

72—129, 338